(12) United States Patent
Corbin et al.

(10) Patent No.: US 9,155,426 B2
(45) Date of Patent: Oct. 13, 2015

(54) REMOVABLE GRIPPING DEVICE FOR A COOKING VESSEL AND COOKING VESSEL PROVIDED WITH SUCH A DEVICE

(75) Inventors: Jean-Yves Corbin, Boulogne (FR); Mathias D'estais, Boulogne (FR)

(73) Assignee: TELE-SHOPPPING, Boulogne (FR)

( * ) Notice: Subject to any disclaimer, the term of this patent is extended or adjusted under 35 U.S.C. 154(b) by 235 days.

(21) Appl. No.: 13/124,624

(22) PCT Filed: Dec. 1, 2009

(86) PCT No.: PCT/FR2009/001362
§ 371 (c)(1),
(2), (4) Date: May 24, 2011

(87) PCT Pub. No.: WO2010/043790
PCT Pub. Date: Apr. 22, 2010

(65) Prior Publication Data
US 2011/0284565 A1     Nov. 24, 2011

(30) Foreign Application Priority Data
Oct. 16, 2008   (FR) .................................... 08 05741

(51) Int. Cl.
| B65D 25/10 | (2006.01) |
| A47J 27/00 | (2006.01) |
| A47J 45/00 | (2006.01) |
| A47J 45/10 | (2006.01) |

(52) U.S. Cl.
CPC ...................................... *A47J 45/10* (2013.01)

(58) Field of Classification Search
CPC ....... A47J 45/10; A47J 45/071; A47J 43/283; A47J 45/061; B65D 2525/285

USPC ................... 294/28–34; 220/759, 573.1, 757; 429/187; 190/116; 16/425, 426; 222/467

See application file for complete search history.

(56) References Cited

U.S. PATENT DOCUMENTS

| 2,092,198 | A | * | 9/1937 | Anderson | 294/34 |
| 2,228,597 | A | * | 1/1941 | Fowler | 92/52 |
| 2,229,859 | A | * | 1/1941 | McCoy | 294/31.1 |
| 2,262,273 | A | * | 11/1941 | Ferrara | 294/27.1 |
| 2,495,954 | A | | 1/1950 | Bailey | |
| 3,790,203 | A | * | 2/1974 | Urbas | 294/31.1 |
| 4,577,367 | A | * | 3/1986 | Durand | 220/759 |
| 5,704,092 | A | | 1/1998 | Nicollet et al. | |
| 6,000,100 | A | * | 12/1999 | Montgelard | 16/425 |
| 6,257,439 | B1 | * | 7/2001 | Hsu | 220/759 |
| 6,318,776 | B1 | * | 11/2001 | Lee | 294/34 |
| 7,611,179 | B2 | * | 11/2009 | Lorthioir et al. | 294/34 |
| 2008/0110910 | A1 | * | 5/2008 | Kleppin | 220/759 |

FOREIGN PATENT DOCUMENTS

EP          0 769 263 A1    4/1997

* cited by examiner

*Primary Examiner* — Shawn M Braden
(74) *Attorney, Agent, or Firm* — Sughrue Mion, PLLC

(57) ABSTRACT

A removable gripping device (1) for a cooking vessel (40), the device including a fixed member, a mobile member, a displacement mechanism capable of being controlled manually, the fixed member comprising a front wall designed to bear at least partially against the external face of the peripheral wall of a cooking vessel, the mobile member, being designed to bear against the internal face of the peripheral wall of the vessel in its closed position. The mobile member has two arms (11, 12), each of the two arms (11, 12) being provided with an end part (15a, 15b) extending substantially parallel to the front wall (16) of the fixed member (2, 3). The displacement mechanism (7, 10) causing the lateral displacement of the end parts (15a, 115b) of the arms (11, 12).

20 Claims, 6 Drawing Sheets

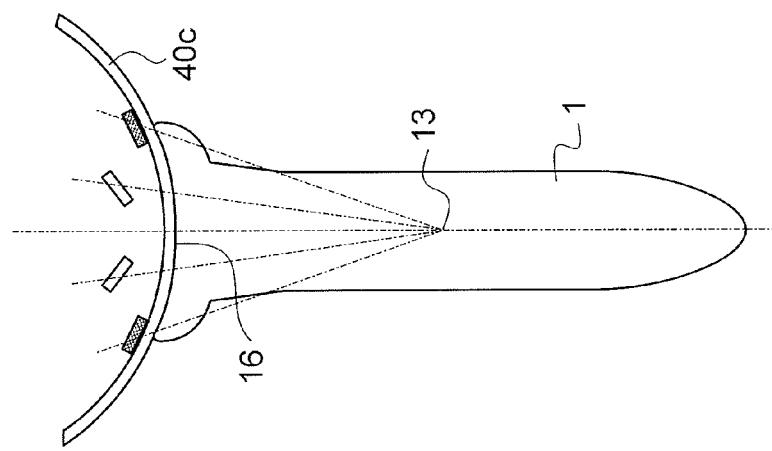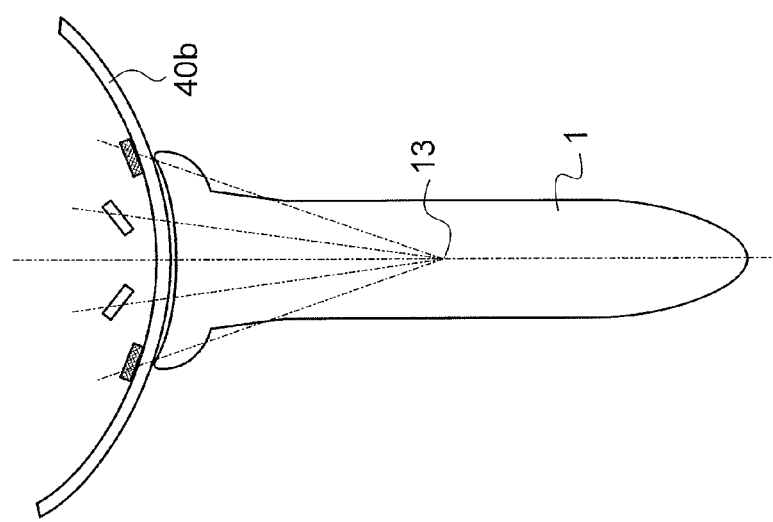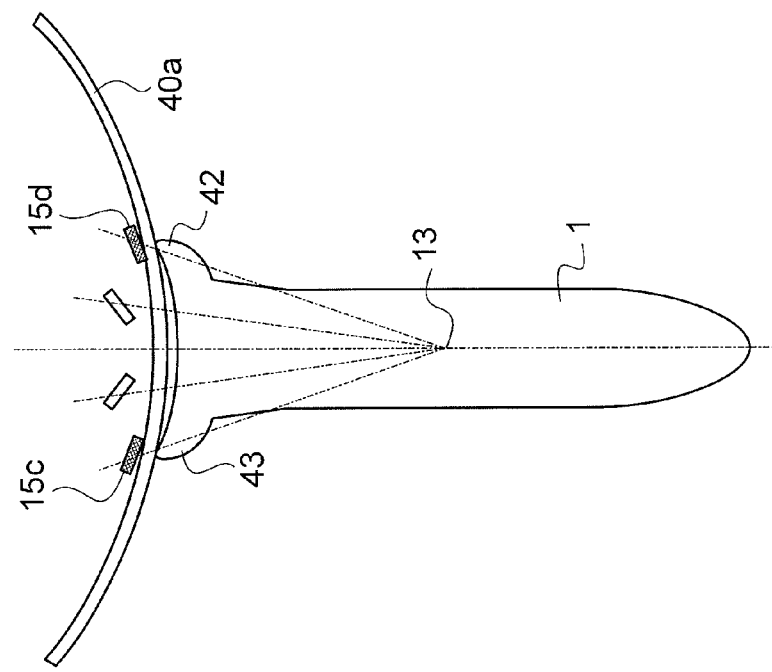

REMOVABLE GRIPPING DEVICE FOR A COOKING VESSEL AND COOKING VESSEL PROVIDED WITH SUCH A DEVICE

CROSS REFERENCE TO RELATED APPLICATIONS

This application is a National Stage of International Application No. PCT/FR2009/001362 filed Dec. 1, 2009, claiming priority based on French Patent Application No. 0805741, filed Oct. 16, 2008, the contents of all of which are incorporated herein by reference in their entirety.

The invention relates to the technical field of cooking utensils and relates more particularly to removable handles for vessels.

By "vessel" is denoted here a hollow object designed to receive products, for example a saucepan, a casserole dish, a frying pan or a high-sided frying pan.

By "removable handle for vessels" is denoted here a device which is able to be mounted on a vessel and dismantled at will and in a controlled manner, said device permitting the vessel to be displaced whether it is empty or not.

The invention relates more particularly to removable handles for vessels with a locking mechanism, making it possible to ensure a very low risk of untimely or accidental dismantling of the removable handle.

In the prior art, various designs of removable handles for vessels are already known.

In a very common design, in order to be used the removable handles require the vessels to be provided with connecting or assembly means. If need be, the connecting means also serve for manually gripping the vessel when the removable handle is not used (see document FR 2 676 169). The presence of said connecting means on the vessel is the subject of numerous drawbacks. The assembly of these connecting means on the vessel, for example by welding or riveting, is a costly operation. Said connecting means, which generally protrude from the lateral wall of the vessel, can permit the retention of dirt and hinder the stacking of the vessels. Moreover, the user is frequently obliged to orientate the handle accurately relative to the vessel, depending on the location of said connecting means.

In a further design, the removable handles may be positioned on vessels of specific shape, said vessels not comprising means for connecting or assembling to the removable handle. The document CA 2187721 thus discloses a handle comprising a fixed jaw which has a shape which is complementary to the external wall of the vessel and a mobile jaw which has a shape which is complementary to the internal wall of the vessel, the movement of the mobile jaw relative to the fixed jaw being a translatory movement, following the longitudinal axis of the handle. In the device disclosed by the document CA 2187721, the handle is provided with a lower lever which is articulated in rotation perpendicular to the longitudinal axis of the shaft of the handle, the pivoting of the lower lever, against a compression spring, causing the linear movement of the mobile jaw and the gripping of the lateral wall of the vessel between the fixed jaw and the mobile jaw, said lateral wall being provided with a folded upper edge, forming a lip, and bearing against the complementary folded wall of the fixed jaw. A variation in the thickness of the lateral wall of the vessels entails greater or lesser compression of the spring, against which the lever pivots. Also, reference may be made to the documents CA 2247643, JP-2001-190432, JP-2002-34804, DE-10100123, JP-2001-275858, WO-2007-101923. Said removable handles which are known from the prior art have numerous drawbacks. In particular, said handles are of complex and costly design and may not be used, with sufficient safety, for vessels such as saucepans of very different diameters. Moreover, the clearance between the fixed jaw and the mobile jaw in the open position is quite small, and removing the folded edge of the vessel is often difficult.

The invention aims, in particular, to remedy the above-mentioned drawbacks.

To this end, according to a first subject, the invention relates to a removable gripping device for a cooking vessel, said device comprising a fixed member and a member which is mobile between an open position and a closed position, said device comprising displacement means capable of being controlled manually between an opening position and a closing position, said displacement means, when moving from the opening position thereof to the closing position thereof, causing the movement of the mobile member from its open position to its closed position, the fixed member comprising a front wall designed to bear at least partially against the external face of the peripheral wall of a cooking vessel, the mobile member, in its closed position, being designed to bear against the internal face of the peripheral wall of said vessel, the mobile member comprising two arms, each of the two arms being provided with an end part extending substantially parallel to the front wall of the fixed member, the displacement means, when moving between the closing position thereof and the opening position thereof, causing the lateral displacement of the end parts of the arms.

In one embodiment, the two arms are articulated relative to one another about a pin, the displacement of the end parts of the two arms comprising a component substantially perpendicular to the pivot pin.

As a variant, the two arms are fixed rigidly at their internal end (opposing the end thereof for gripping the vessel), the resilience of the arms being sufficient to permit their flexion in the event of the application of mechanical stress.

The two arms are, for example, made in one piece with the pivot pin, the two arms being, in particular, the two legs of a torsion spring of which the coils form the pivot pin.

In one embodiment, the two arms are mounted in an articulated manner on a pin, the displacement of the end parts of the two arms being carried out substantially according to a circular arc, the axis thereof substantially containing the pivot pin.

Advantageously, the displacement means comprise a cam and a lever, the cam being attached to the lever or made in one piece with the lever and transforming the rotational movement of the lever into a movement separating the arms relative to one another.

Advantageously, the arms are articulated about a pin and the lever is articulated about a pin substantially perpendicular to the pivot pin of the arms, a cam transforming the rotational movement of the lever into a movement separating the arms from one another.

As a variant, the system for separating the arms is in the form of a connecting rod system, of which one end is connected to the lever and the other end to each of the arms, such that the lifting of the lever causes the separation of the arms, by means of the play between the connecting rods.

The device advantageously comprises blocking means, capable of immobilizing the mobile member in its closed position.

In one embodiment, the blocking means comprise means carried by the cam and complementary means carried by a part fixed to a control button.

Advantageously, the means carried by the cam comprise a projection capable of bearing reversibly against a projection of a slider fixed to the control button.

In one embodiment, the end parts of the arms extend, in the open position, on both sides of the front wall of the fixed member.

Advantageously, the end parts of the arms are provided with a curved portion, when viewed in section along a plane substantially perpendicular to the longitudinal direction thereof.

In one advantageous embodiment, the device comprises a visual indicator, passing from a first state to a second state, when the displacement means leave the opening position thereof or the closing position thereof.

The invention proposes, according to a second subject, a cooking assembly or set comprising at least one cooking vessel accompanied by at least one gripping device as disclosed above. Commercially, said assembly may comprise a vessel and a gripping device that are separate, or a vessel on which the gripping device is mounted.

Further subjects and advantages of the invention will be revealed by reading the following description with reference to the accompanying drawings, in which:

FIG. 14 is a schematic view from above illustrating the mounting of a device of the type shown in FIGS. 1 to 13 on a vessel of large diameter;

FIG. 15 is a schematic view from above illustrating the mounting of a device of the type shown in FIGS. 1 to 13 on a vessel of medium diameter;

FIG. 16 is a schematic view from above illustrating the mounting of a device of the type shown in FIGS. 1 to 13 on a vessel of small diameter.

Figure 1:
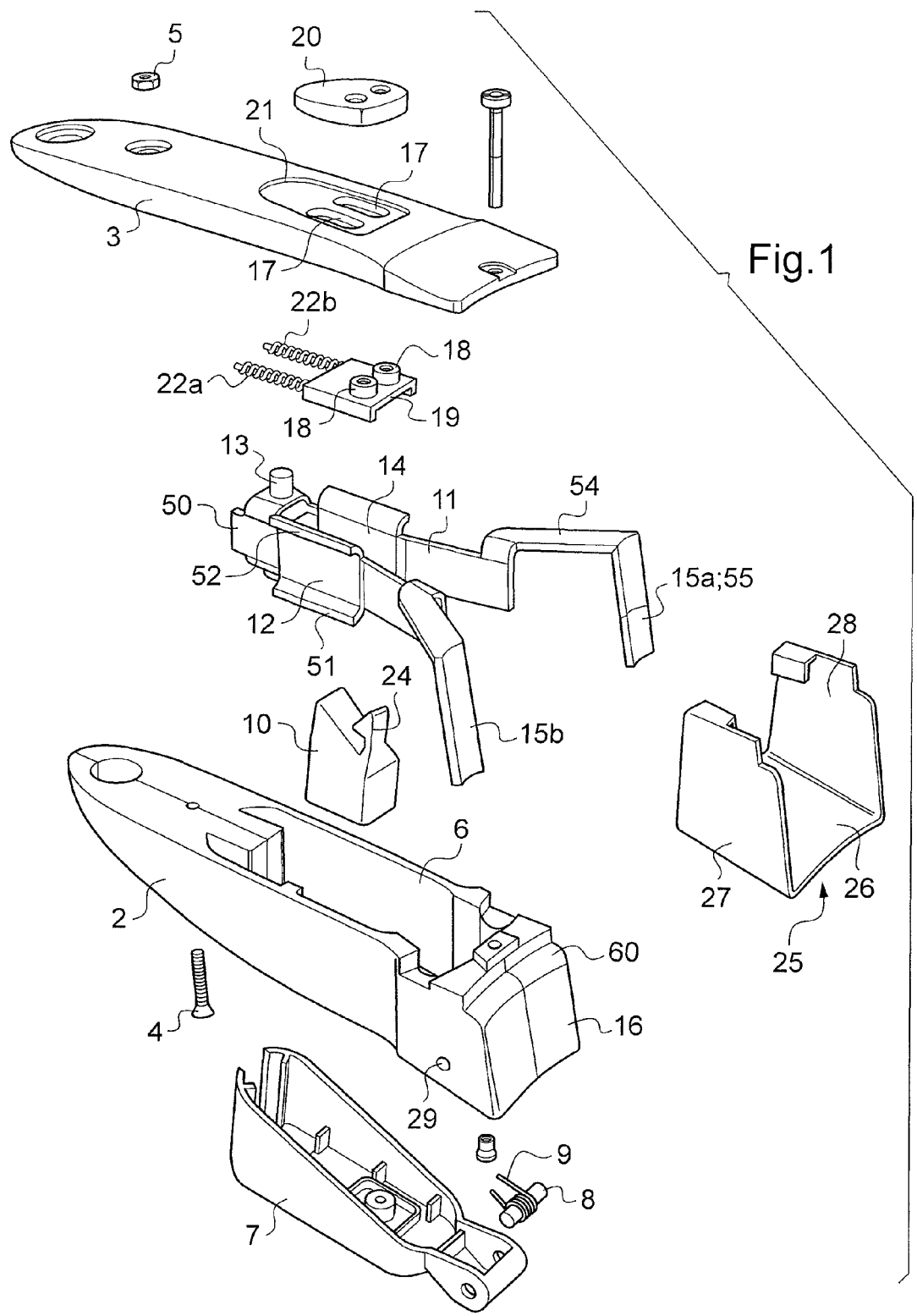
FIG. 1 is an exploded perspective view of a device for gripping a vessel, according to one embodiment.
Figure 2:
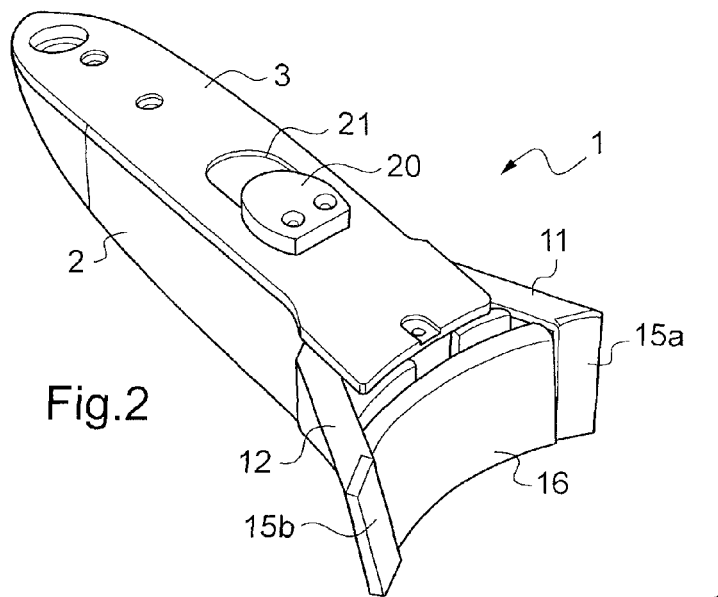
FIG. 2 is a perspective view of the device shown in FIG. 1, said device being shown in the closed position, i.e. a position for mounting on a vessel, the vessel not being shown in said FIG. 2, for reasons of simplicity.
Figure 3:
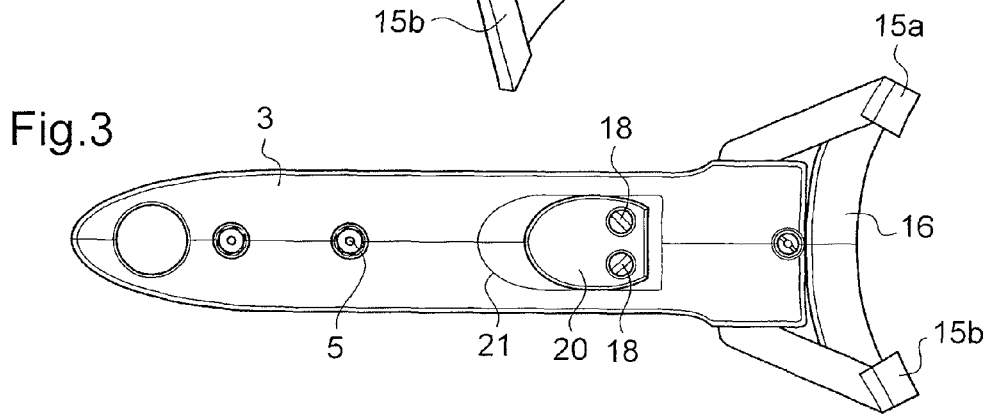
FIG. 3 is a view from above of the device shown in FIG. 2.

The gripping device shown in the figures (hereinafter denoted the removable handle or handle 1) is provided with locking means, making it possible to ensure a very low risk of untimely or accidental dismantling.

In the remainder of this description, the terms "lower", "upper", "longitudinal", "transverse", "top", "bottom", "front", "rear" are used with reference to the removable handle 1 mounted on a vessel, said vessel being positioned on any work surface.

Reference is firstly made to FIGS. 1 to 9.

The handle 1 comprises a lower shell 2 and an upper shell 3. The lower and upper shells 2, 3 are, for example, made of molded or injection-molded polymer material, which is preferably heat-resistant, for example made of thermosetting polymer material such as Bakelite® (polyoxybenzyl methylene glycol anhydride). The shells 2, 3 are assembled by a screw 4/nut 5 assembly, in the embodiment shown, further assembly methods being able to be used, for example bonding, welding, soldering, depending on the materials used for producing the shells 2, 3. It is possible, as a variant, to provide a one-piece design.

The lower shell 2 is provided with a dedicated space 6 in which a lever 7 is at least partially housed, said lever 7 being mounted in an articulated manner on the lower shell 2, along a substantially transverse pin 8. A resilient means 9 such as a torsion spring is mounted on the pin 8, said resilient means 9 causing the lever 7 to protrude downwards, in the absence of manual activation of the lever 7.

The lever 7 is hollow and a cam 10 is fixed in the hollow of the lever 7. In one embodiment, said cam 10 is, for example, metal and attached, by screwing or other equivalent means, to the hollow of the lever 7, made of polymer material, resistant both to mechanical stress and heat, and formed by molding or injection-molding. It is also conceivable to produce the cam and lever by machining in a plastic, ceramic or metal material. In a further embodiment, the lever and the cam are made in one piece.

The handle 1 comprises two arms 11, 12 articulated about a pin 13 substantially perpendicular to the elongation of the handle 1.

Said arms 11, 12 are made, for example, of stainless steel, for example AISI 304 L.

Each arm 11, 12 comprises a lateral wall 14, against which a corresponding wall of the cam 10 bears when the lever 7 pivots. Each arm 11, 12 comprises a distal end part 15a, 15b extending substantially parallel to the front wall 16 of the lower shell 2. As will appear more fully in the remainder of this description, the end parts 15a, 15b of the arms 11, 12 are designed to bear against the internal face of the wall of a vessel when the front wall 16 of the lower shell 2 bears against the external face of the wall of said vessel and the handle 1 is fixed thereto.

The upper shell 3 comprises two slots 17 for the passage of studs 18 of a slider 19. A control button 20 is mounted, for example by screws, on said slider 19. Said control button 20 is mounted so as to be mobile in longitudinal translation in a groove 21 of the upper shell 3. Said translatory movement of the control button 20 thus produces the movement of the slider 19 against a resilient means such as a compression spring 22a, 22b. In the absence of manual activation of the control button 20, said button 20 is in abutment in the forward end of travel position in the groove 21, said position being shown in FIGS. 2 and 6. Advantageously, the end of travel position of the control button may be monitored visually. For example, a colored disk 20f becomes visible through an opening 3f in the upper shell when the button 20 is in the end of travel position.

The slider 19 carries, on the lower face, a projection 23 forming a hook, the cam 10 being provided in the upper part with a projection 24 which is complementary to the projection 23 of the slider 19.

A collar 25 grips together the two shells 2, 3. In the embodiment shown, said collar 25 has a transverse U-shaped profile, of which the base 26 bears against the lower wall of the lower shell 2 and the two wings 27, 28 conceal the through-passages 29 of the pivot pin 8 of the lever 7.

Said collar 25 protects the material forming the shells 2, 3 from direct exposure to flames or a radiating heat source. Advantageously, the collar 25 is made of steel, for example stainless steel of the AISI 304 L type (known as 18/10 steel).

Figure 6:
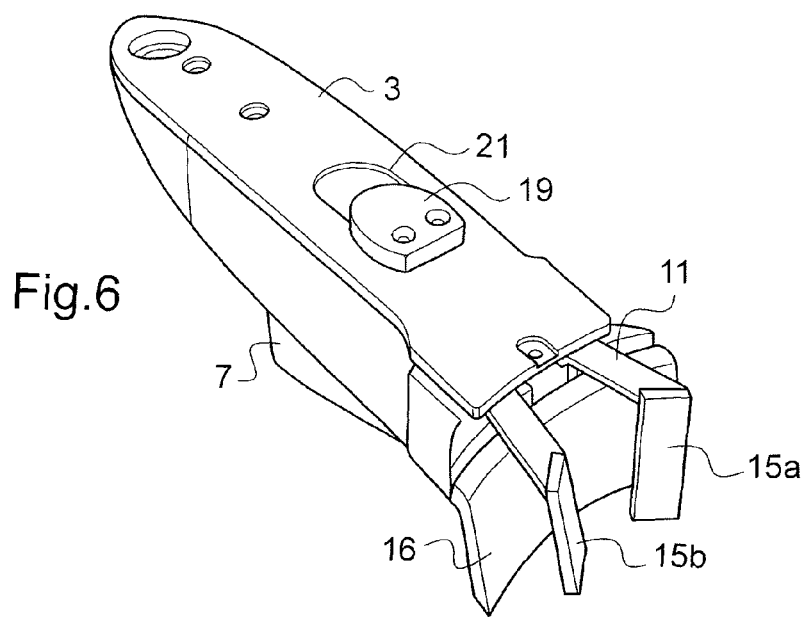
FIG. 6 is a perspective view of the device shown in FIGS. 2 to 5, said device being seen in the open position.
Figure 7:
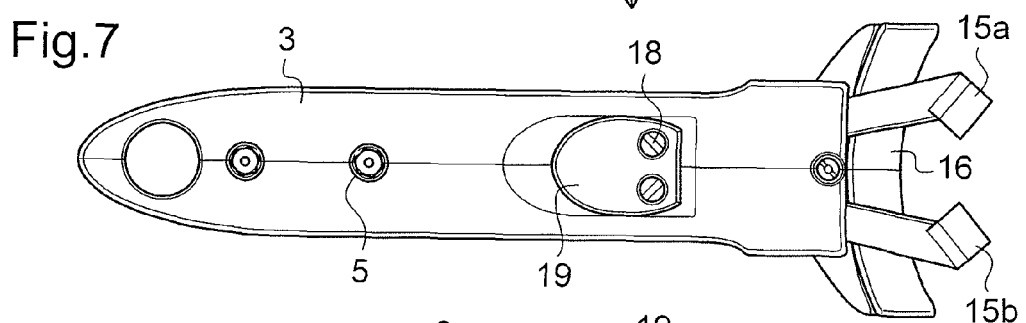
FIG. 7 is a view from above of the device shown in FIG. 6.

As appears in FIG. 6, in particular, the handle 1 has an ergonomic overall outer casing, without sharp parts and without a cutting edge, the shells 2, 3 advantageously having a treated surface state, for example satin-finished or lacquered. Where appropriate, the shells 2, 3 are provided with a non-slip coating.

Figure 4:
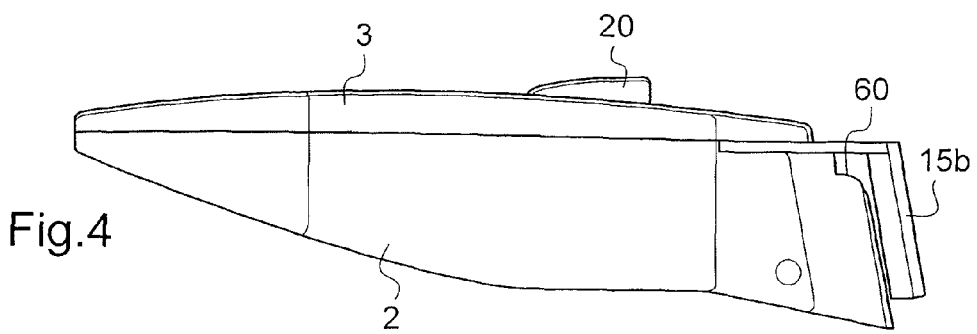
FIG. 4 is a lateral view of the device shown in FIGS. 2 and 3.
Figure 5:
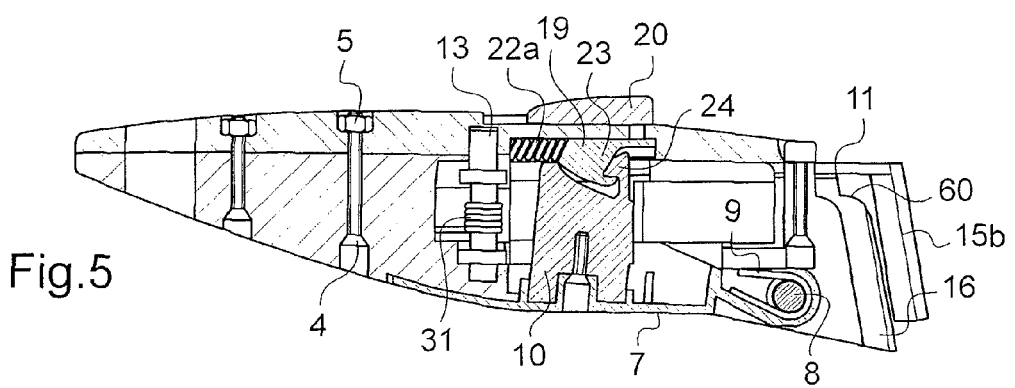
FIG. 5 is a view in longitudinal section of the device shown in FIGS. 2 to 4.
Figure 8:
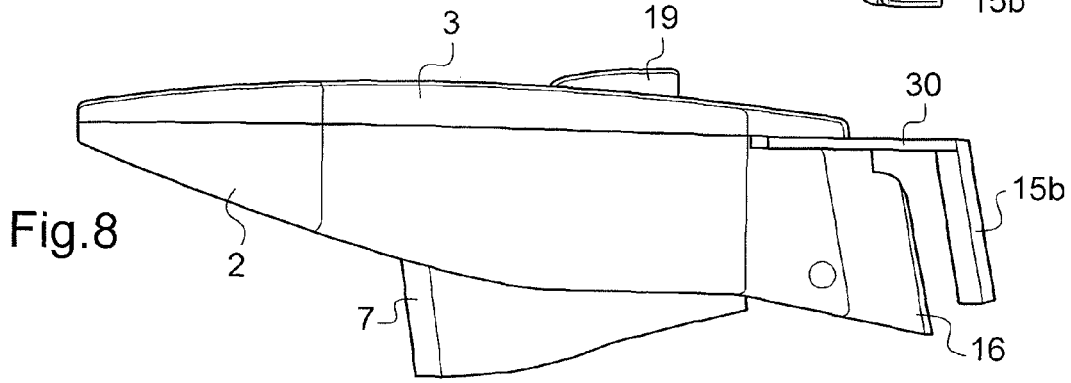
FIG. 8 is a lateral view of the device shown in FIGS. 6 and 7.
Figure 9:
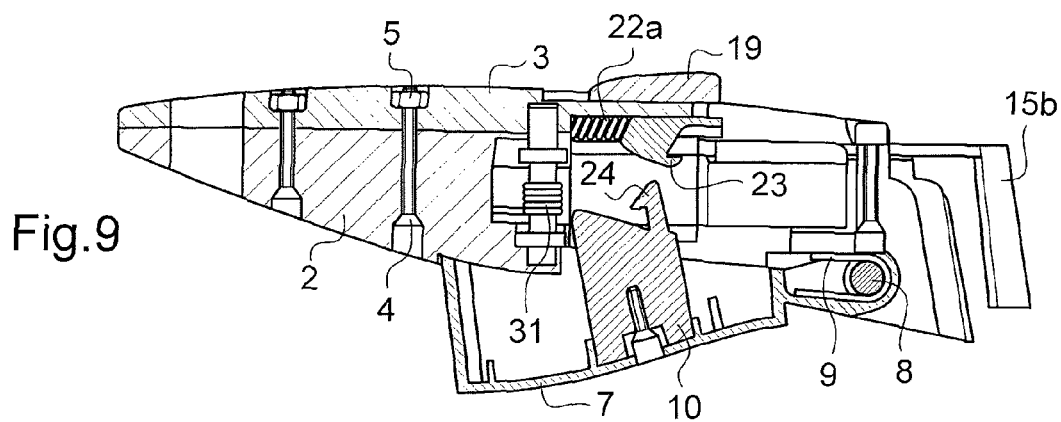
FIG. 9 is a longitudinal sectional view of the device shown in FIGS. 6 to 8.

As appears in FIGS. 4 and 8, in particular, the arms 11, 12 each comprise a proximal part 30 which is mobile between the upper shell 3 and the lower shell 2. A resilient member, such as a torsion spring 31, ensures, in the open position of the handle 1, i.e. in the position not mounted on a vessel, that the two arms 11, 12 are brought together. In the embodiments shown, said resilient member is mounted on the pivot pin 13 of the arms 11, 12.

In further embodiments, not shown, the two arms 11, 12 are formed by the two legs of a torsion spring, mounted on a pin, such as the pin 13 which has been placed in the figures.

The handle 1 comprises, therefore, a member which is mobile between an open position and a closed position, said mobile member comprising two arms 11, 12 articulated about a pin 13.

In the embodiments shown, said articulation is provided by the mounting of each of the two arms 11, 12 on a transverse pin 13, a resilient means such as a torsion spring 31 providing a torque between the two arms 11, 12 tending to separate them.

In further embodiments, not shown, said articulation is provided about a substantially longitudinal axis.

The handle 1 comprises displacement means capable of being controlled manually between an opening position and a closing position. Said displacement means, when moved from the opening position thereof to the closing position thereof, cause the movement of the mobile member.

In the embodiments shown, said displacement means comprise a lever 7 articulated about a substantially transverse pin 8, a cam 10 attached to said lever 7 or made in one piece with said lever 7, the cam 10 transforming the rotational movement of the lever 7 into a rotational movement of each of the two arms 11, 12 about the pin 13.

In further embodiments, not shown, the cam transforms the rotational movement of the lever 7 into a translatory movement of each of the two arms, said translation causing the mutual separation thereof in a substantially transverse direction.

The handle 1 comprises a fixed member provided with a front wall designed to bear against the external face of the lateral wall of a vessel.

In the embodiments shown, said front wall is substantially integrally formed by the front wall 16 of the lower shell 2. Advantageously, said front wall is provided with a protective coating, for example a steel strip, in particular stainless steel, or a heat-resistant elastomeric coating. Said front wall 16 is curved with a single concave portion or a double concave portion, so as to follow as closely as possible the external walls of vessels of conventional dimensions.

The handle 1 comprises blocking means capable of reversibly immobilizing the mobile member in its closed position.

In the embodiments shown, said blocking means comprise a projection 23 of a slider 19, said projection 23 bearing against a corresponding projection 24 of the cam 10, the movement of said slider 19 being controlled manually by actuating an upper button 20 against resilient means, such as for example compression springs 22a, 22b.

In further embodiments, not shown, the reversible blocking of the cam 10 is obtained by a magnet, or even by snapping-in a deformable part of the cam.

The operation of the handle 1 as shown in the figures is as follows, starting from a state where it is not mounted on a vessel:

Firstly, the handle 1 is gripped manually, the lever 7 being in the extended position, shown in FIG. 6. The control button 20 is then in abutment in the end of travel position, by the action of the resilient means such as compression springs 22a, 22b. A visual means, such as a colored disk 20f which is visible in line with an opening 3f in the upper shell 3 makes it possible to monitor said state of the control button 20.

Figure 10:
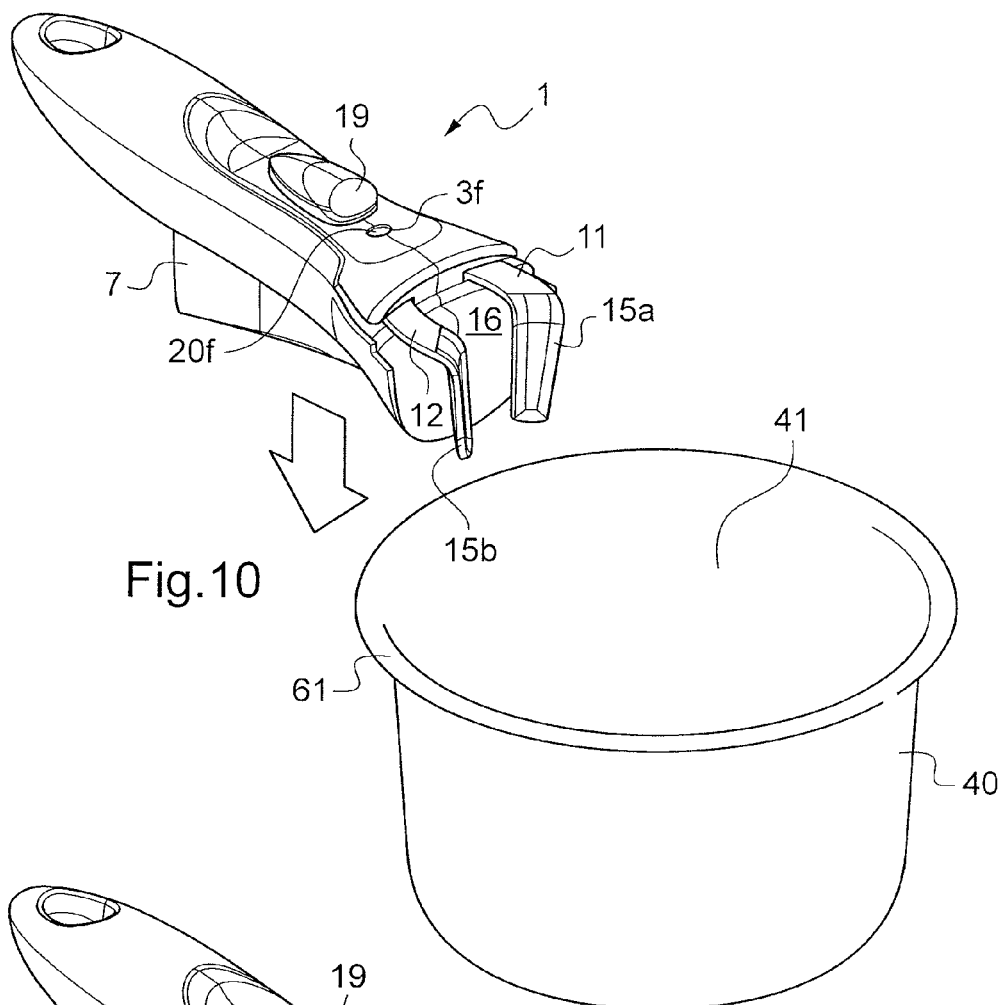
FIG. 10 is a perspective view of a device according to the invention, in a variant, said device being seen before mounting on a vessel.
Figure 11:
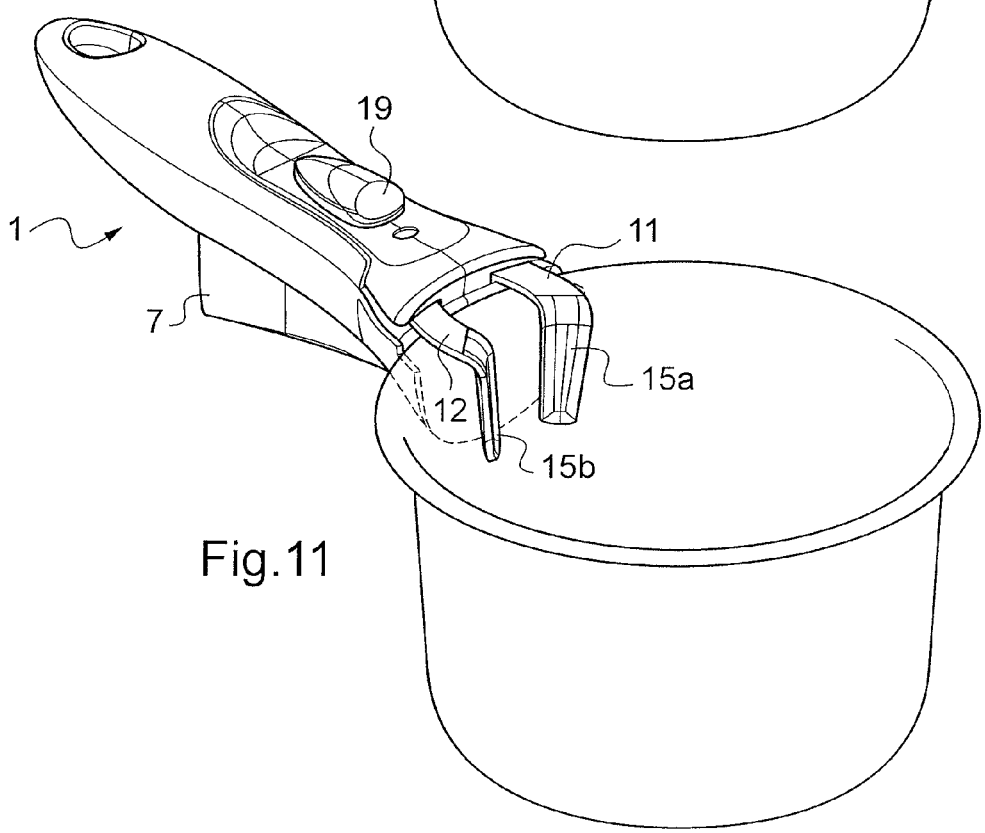
FIG. 11 is a perspective view of the device shown in FIG. 10, seen in the position of preparation for mounting on a vessel.
Figure 12:
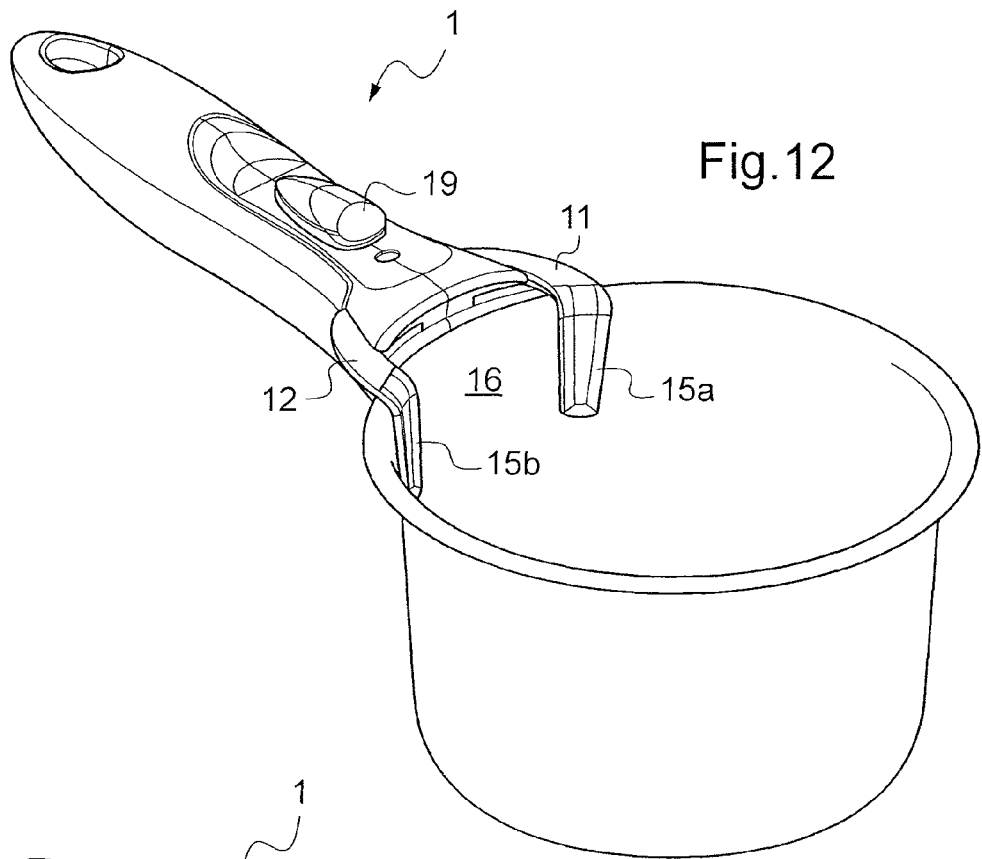
FIG. 12 is a perspective view of the device shown in FIGS. 10 and 11, seen in the position mounted on a vessel.
Figure 13:
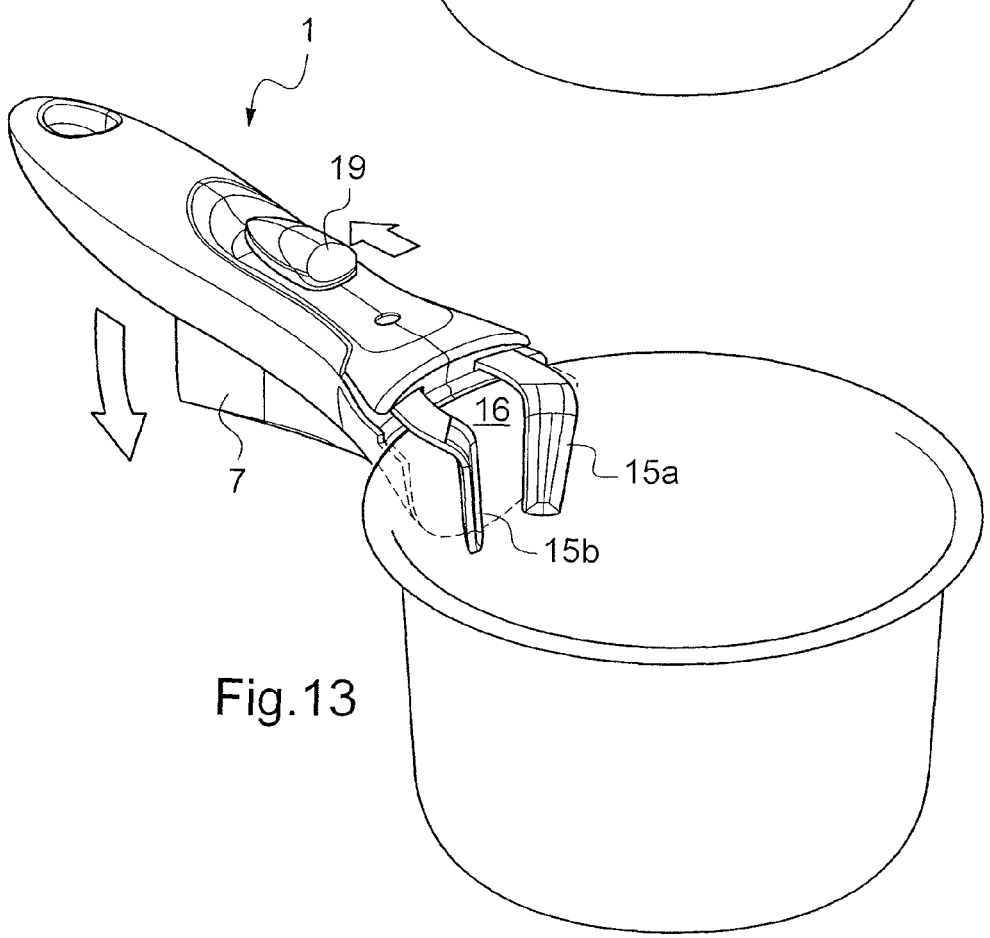
FIG. 13 is a view of the device shown in FIGS. 10 to 12, seen in the position dismantled from a vessel.

Then, the handle 1 is manipulated so that a wall of the vessel 40 is accommodated between the front wall 16 of the lower shell 3 and the arms 11, 12. To achieve this, a substantially vertical movement of the handle 1 is necessary as shown in FIG. 10.

The lever 7 is thus actuated so as to pivot about the pin 8. Said pivoting movement of the lever 7 causes the contact of the lateral walls of the cam 10 with the lateral walls 14 of the arms 11, 12 and the separation of said two arms 11, 12, relative to one another. Said separation causes a movement of the end parts 15a, 15b of the arms 11, 12 substantially along a circular arc, the axis thereof substantially containing the pivot pin 13. By this circular arc movement the end parts 15a, 15b of the two arms 11, 12 bear against the internal face 41 of the wall of the vessel 40. The locking is obtained by actuating the button 20 against the spring 22a, 22b, the projection 24 of the cam 10 thus being housed against the projection 23 of the slider 19, the elastic return of the control button 20 blocking the cam 10. By this elastic return, the control button is again in abutment in the end of travel position. A visual means, such as a colored disk 20f which is visible in line with an opening 3f in the upper shell 3, makes it possible for this state of the control button 20 to be monitored.

As appears in FIGS. 14 to 16, the articulation of the two arms 11, 12 relative to one another makes it possible to mount the handle 1 on vessels 40 of very different diameters.

When the vessel 40a is of large diameter, the contact between the front wall 16 of the handle and the wall of the vessel may be limited to the lateral parts 42, 43 of said front wall 16.

Conversely, when the vessel 40c is of small diameter, almost all the front wall 16 of the handle 1 comes substantially into contact with the wall of the vessel.

When the vessel 40a is of large diameter (FIG. 14), the contact between the wall of the vessel and the end parts 15a, 15b of the arms 11, 12 is substantially limited to one lateral edge 15c, 15d of said end parts.

Conversely, when the vessel 40c is of small diameter (FIG. 16), the contact between the wall of the vessel and the end parts 15a, 15b of the arms 11, 12 is obtained substantially over the entire width of said end parts.

The dismantling of the handle 1 is obtained in the following manner. The control button 20 is actuated against its return spring and releases the cam 10, the lever 7 returning to its bottom position under the action of a return spring 9 housed around the pin 8. The two arms 11, 12 are brought together under the action of the return spring 31, and the end parts 15a, 15b of the arms 11, 12 substantially describe a circular arc, the axis thereof substantially containing the pivot pin 13. By this circular arc movement, the end parts 15a, 15b of the arms 11, 12 leave the support of the wall of the vessel 40 and a substantially vertical movement on the handle makes it possible to release it completely from the vessel 40.

The articulated arms 11, 12 comprise, starting from their proximal end for mounting on the pivot pin 13:

- a first section 50 provided with a central planar part and lower and upper folded edges 51, 52. Said folded edges facilitate the action of separating the arms 11, 12 by the cam 10;
- a second section 53 forming an angle of a few degrees with the first section 50;
- a third section 54 substantially perpendicular to the second section 53;
- a fourth section 55 substantially perpendicular to the third section 54, said fourth section 55 being designed to bear against the internal face of the wall of the vessel when the handle 1 is in the mounted position.

Advantageously, the fourth section 55 is curved as appears in FIG. 1. This curved portion makes it possible to prevent the movement of separation of the arms, when positioning the handle, from being translated into an abrupt contact of this fourth section 55 against the internal wall of the vessel. This arrangement is particularly advantageous when the vessel is provided with a Teflon® coating. More generally, the risk of scratching the internal wall of the vessel is thus avoided.

In the embodiments shown, the arms 11, 12 are made, for example, by stamping and folding a metal strip of rectangular section, for example made of stainless steel. In further embodiments, the end parts 55 of the arms 11, 12 are of substantially round or oval section.

The front part of the handle 1 comprises an edge 60 forming a shoe. Said shoe has a curvature complementary to the curvature of the pouring lip 61 of conventional vessels. The ability to hold the handle in the mounted position on the vessel is thus reinforced, in particular when the vessel is heavy.

It is understood that the handle has a particularly advantageous application for cooking vessels, but it also has an application for carrying other vessels, in particular for laboratories.

The invention claimed is:

1. A removable gripping device for a cooking vessel, said removable gripping device comprising a fixed member and a member which is mobile between an open position and a closed position, said removable gripping device comprising displacement means capable of being controlled manually between an opening position and a closing position, said displacement means, when moving from the opening position thereof to the closing position thereof, causing the movement of the mobile member from its open position to its closed position, the fixed member comprising a front wall designed to bear at least partially against an external face of a peripheral wall of a cooking vessel, the mobile member, in its closed position, being designed to bear against an internal face of the peripheral wall of the vessel, wherein the mobile member comprises two arms, each of the two arms being provided with an end part extending substantially parallel to the front wall of the fixed member, the displacement means, when moving between the closing position thereof and the opening position thereof, causing a lateral displacement of the end parts of the arms relative to an elongation of said removable gripping device, said displacement means comprising a cam and a lever, the cam being attached to the lever or made in one piece with the lever and transforming the rotational movement of the lever into a movement separating the arms relative to one another.

2. The device as claimed in claim 1, wherein the two arms are articulated relative to one another about a pivot pin, the lateral displacement of the end parts of the two arms comprising a component substantially perpendicular to the pivot pin.

3. The device as claimed in claim 2, wherein the two arms are made in one piece with the pivot pin.

4. The device as claimed in claim 1, wherein the two arms are mounted in an articulated manner on a pivot pin, the displacement of the end parts of the two arms being carried out substantially according to a circular arc, the axis thereof substantially containing the pivot pin.

5. The device as claimed in claim 1, wherein as the two arms are articulated about a pivot pin and the lever is articulated about a pin substantially perpendicular to the pivot pin of the arms, the cam transforms the rotational movement of the lever into a movement separating the arms from one another.

6. The device as claimed in claim 1, wherein it comprises blocking means, capable of immobilizing the mobile member in its closed position.

7. The device as claimed in claim 6, wherein the blocking means comprise a piece carried by a cam and a complementary piece carried by a part fixed to a control button.

8. The device as claimed in claim 7, wherein said piece carried by the cam comprises a projection configured to bear reversibly against a projection of a slider fixed to the control button.

9. The device as claimed in claim 1, wherein the end parts of the arms extend, in the open position, on both sides of the front wall of the fixed member.

10. The device as claimed in claim 1, wherein the end parts of the arms are provided with a curved portion, when viewed in section along a plane substantially perpendicular to a longitudinal direction thereof.

11. The device as claimed in claim 1, wherein it comprises a visual indicator, passing from a first state to a second state, when the displacement means leave the opening position thereof or the closing position thereof.

12. An assembly comprising at least one cooking vessel and at least one removable gripping device for the vessel, as claimed in claim 1.

13. The removable gripping device according to claim 12, wherein the removable gripping device is elongated in a first direction and the displacement means, when moving between the closing position and the opening position, moves the end parts of the two arms in a second direction that is transverse and lateral relative to the first direction.

14. The removable gripping device according to claim 12, wherein the displacement means, when moving between the closing position and the opening position, moves each of the end parts of the two arms along a respective arcuate path.

15. The removable gripping device according to claim 12, wherein the displacement means, when moving between the closing position and the opening position, moves each of the end parts of the two arms about a pivot point.

16. The removable gripping device according to claim 12, wherein the removable griping device is elongate so as to be gripped by one hand and the displacement mechanism comprises a control button on top of the removable gripping device configured to be actuated by a user's thumb to cause movement of the mobile member from the open position to the closed position.

17. The removable gripping device according to claim 1, wherein the end parts of each arm extend beyond the front wall of the fixed member in a longitudinal direction of the removable gripping device.

18. The removable gripping device according to claim 12, wherein the end parts of each arm extend beyond the front wall of the fixed member in a longitudinal direction of the gripping device.

19. The removable gripping device according to claim 1, further comprising a handle portion, and wherein the front wall is part of the handle portion and is stationary with the handle portion during manual control of the displacement means.

20. The removable gripping device according to claim 12, further comprising a handle portion, and wherein the front wall is part of the handle portion and is stationary with the handle portion during manual control of the displacement means.

* * * * *